US006978234B1

(12) United States Patent
Battaline et al.

(10) Patent No.: US 6,978,234 B1
(45) Date of Patent: Dec. 20, 2005

(54) CONFIGURABLE REAL PROTOTYPE HARDWARE USING CORES AND MEMORY MACROS

(75) Inventors: Robert P. Battaline, Essex Junction, VT (US); Emory D. Keller, Jericho, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 09/602,369

(22) Filed: Jun. 23, 2000

(51) Int. Cl.[7] ............... G06F 9/455; G06F 13/00
(52) U.S. Cl. .................. 703/28; 703/24; 703/27; 714/28; 714/30
(58) Field of Search .................. 703/24, 26, 27, 703/13, 28; 714/27

(56) References Cited

U.S. PATENT DOCUMENTS

| | | | | |
|---|---|---|---|---|
| 4,450,519 A | * | 5/1984 | Guttag et al. | 712/33 |
| 4,453,211 A | * | 6/1984 | Askinazi et al. | 703/24 |
| 5,313,079 A | * | 5/1994 | Brasen et al. | 257/206 |
| 5,325,512 A | * | 6/1994 | Takahashi | 703/28 |
| 5,768,152 A | * | 6/1998 | Battaline et al. | 702/186 |
| 6,032,268 A | * | 2/2000 | Swoboda et al. | 714/30 |

* cited by examiner

Primary Examiner—Thai Phan
(74) Attorney, Agent, or Firm—Richard A. Henkler; Dillon & Yudell LLP

(57) ABSTRACT

A method of creating a prototype data processing system, by configuring a hardware development chip (HDC) according to user-defined settings, building user-defined logic adapted to function with the configured development chip, and allowing for the re-configuration of the HDC and user-defined logic after debugging. The HDC has several data processing macros including a processor core macro, a ROM emulation macro, a memory macro, and a bus macro. The macros may be configured by a configuration pin block which is connected to external configuration pins on the HDC. Customer logic is built using a field programmable gate array, which is interconnected with external ports of the HDC. The HDC and customer logic are verified using a debug port on the HDC, which is connected to a debug workstation. The invention allows a user to easily and quickly debug an application-specific integrated circuit (ASIC) design with a unique version of selected processor cores.

11 Claims, 7 Drawing Sheets

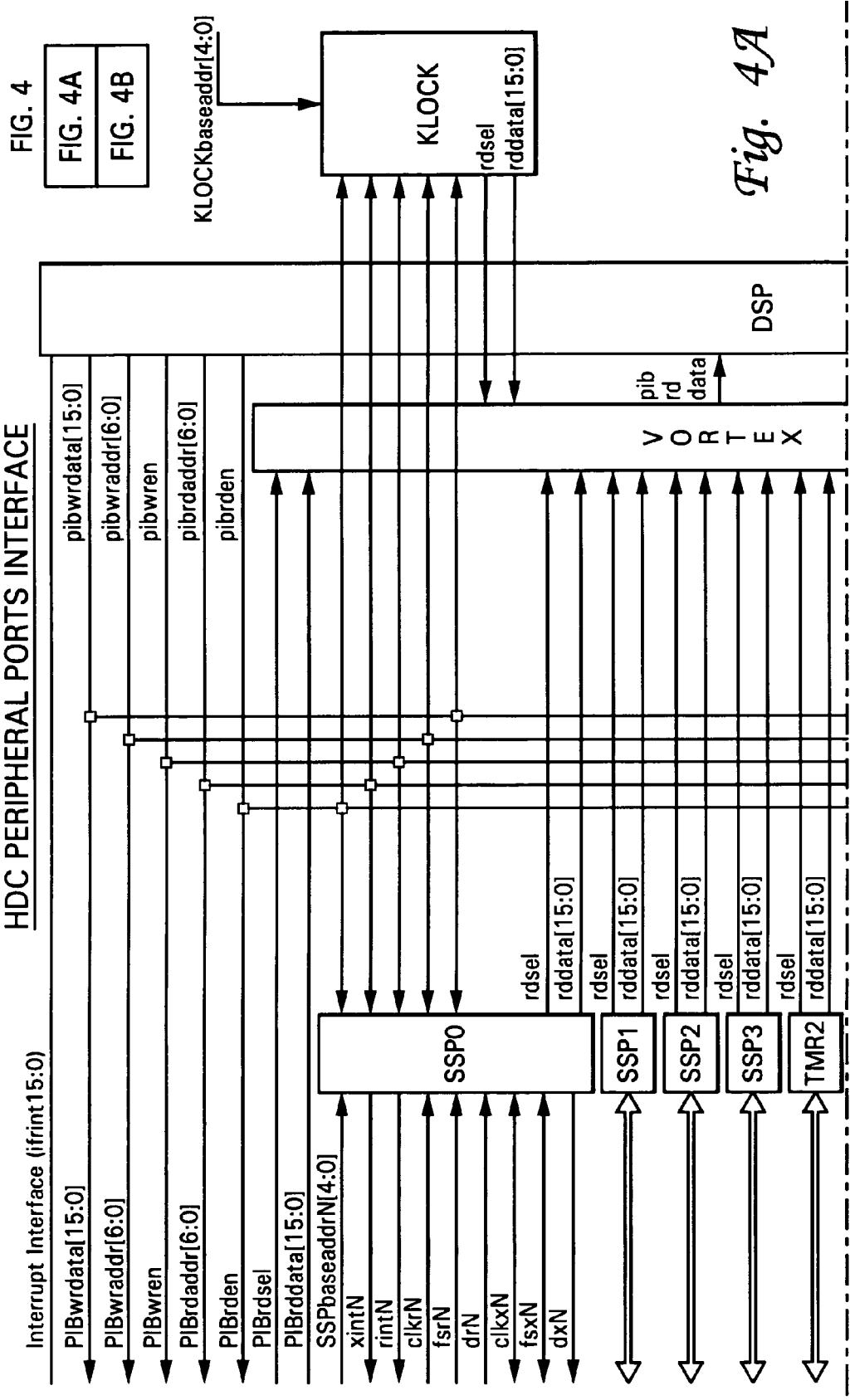

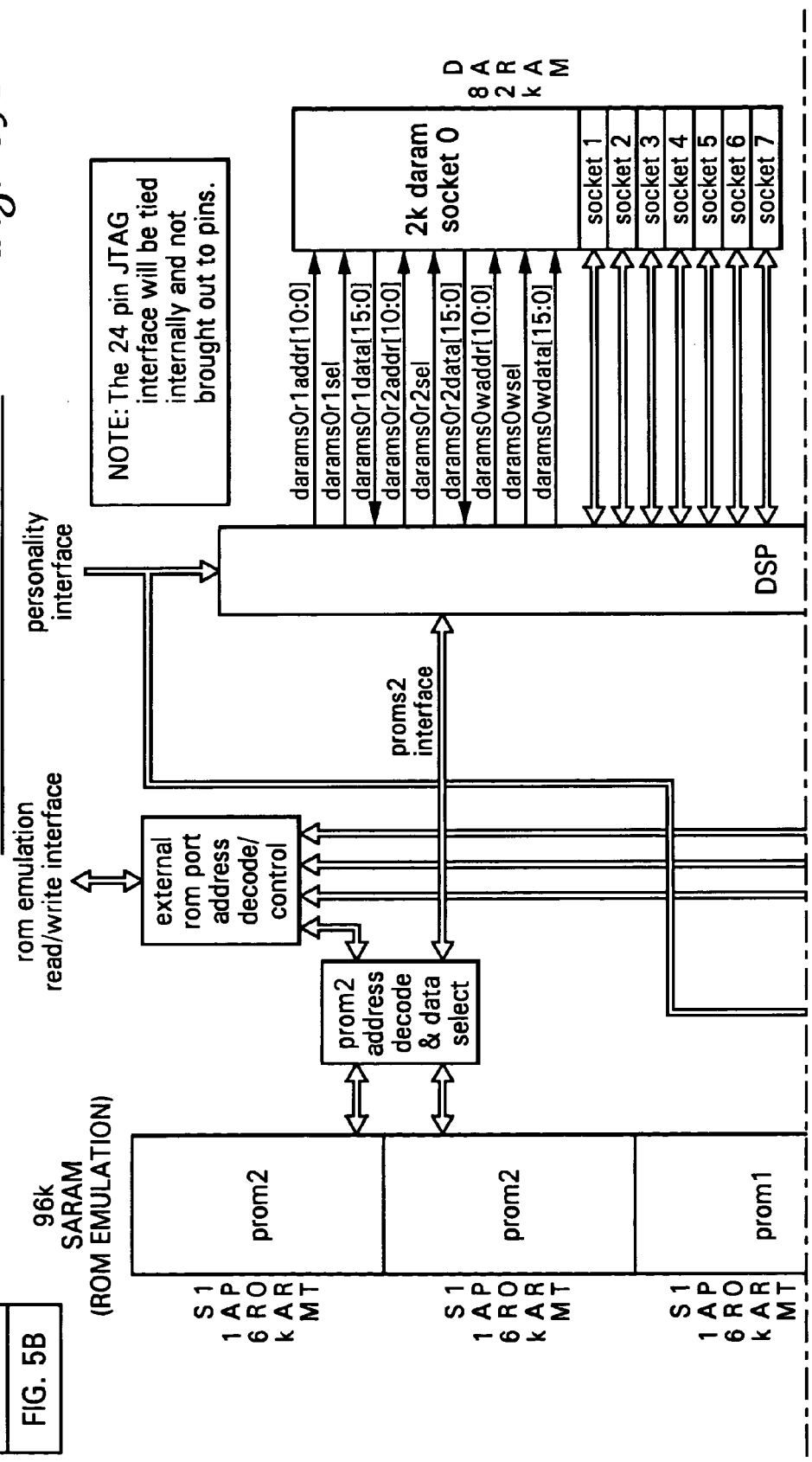

CONFIGURABLE REAL PROTOTYPE HARDWARE USING CORES AND MEMORY MACROS

BACKGROUND OF THE INVENTION

1. Field of the Invention

The present invention generally relates to data processing systems, particularly diverse computing systems that require differing hardware designs, and more specifically to a method and system for configuring a development chip to allow rapid prototyping of customized user solutions.

2. Description of Related Art

Modern data processing systems are used in a wide variety of applications. The most commonly known data processing systems are the popular desktop and portable computing systems referred to as personal computers (PCs), as well as the more powerful mini-computers and mainframe computers. Those machines are general purpose computing systems, but there are many specialized data processing systems that are adapted for more narrow purposes. These special applications include, for example, process control, telecommunications, diagnostics, multimedia generation (visual rendering or audio signal processing), network connectivity, etc.

Certain hardware components are generally found in all of the foregoing data processing systems. First, every computing system has one or more central processing units, or cores. A processor core contains various execution units, such as arithmetic logic units, for carrying out program instructions, and various registers, such as general purpose or special purpose registers, which temporarily store oper- and data that is used by, or output from, the execution units. Every data processing system also uses one or more memory devices for storing data and program instructions. These memory devices typically include volatile memory, such as random-access memory (RAM). Many different types of RAM may be utilized, such as static random-access memory (SRAM), dynamic random-access memory (DRAM), and synchronous dynamic random-access memory (SDRAM). The volatile memory may be arranged in a single system array, or in a distributed array, such as with a non-uniform memory access (NUMA) design. Non-volatile memory devices are also used, e.g., read-only memory (ROM) which stores the boot instructions (firmware) for starting up the computing system. Other types of non-volatile memory may additionally be provided, such as electrically-erasable read-only memory (EEPROM). The processor cores are further coupled to a variety of peripheral, or input/output (I/O) devices. Several of these devices are provided primarily for the user interface, and include features such as a keyboard, display, and graphical pointing device (e.g., a "mouse"). Other peripheral devices may be more specialized in nature.

Given the diversity in the various functions of data processing systems, it is not surprising that they have significant differences in both hardware components and interconnection schemes. For example, there are many different bus standards for interconnecting the processor core(s) to the remaining components. These standards include, among others, the Industry Standard Architecture (ISA) bus, and the Peripheral Component Interconnect (PCI) bus. Different protocols or connectors may also be utilized to communicate with the peripheral devices, e.g., parallel ports or serial ports. These differences present serious challenges to manufacturers who attempt to fabricate multiple types of computing systems.

Current trends are moving to "system on a chip" solutions. They often include a number of cores whose function, depending upon their use with other cores, can be quite different. A simple example of this is a multi-processor system wherein one processor operates as the "service" processor, to manage and coordinate the functions of the remaining processors, or application-specific integrated circuits (ASICs). Due to the complexity of these designs, verification of the configuration along with the user logic is desired before proceeding to the costly and time-consuming process of releasing the final design, and then debugging system level errors. In the past, system level designers have depended upon either software simulation, or complex hardware emulation systems, to verify the designs. Both of these approaches, however, have significant drawbacks.

In the case of the software model, the simulation time is excessively long, typically resulting in an incomplete functional test. The hardware emulation method requires a large emulation box, where the source design is compiled into field programmable gate arrays (FPGAs), and a test pad is available for the simulation interface. While this method is faster than software simulation, it is expensive, complex, non-portable, and often still fails to operate at the full functional speed. Since these FPGA's often cannot function at full operational speed, then real-time applications cannot be adequately tested. The PGA approach also fails to provide adequate support for varying memory configurations.

A third option is to fabricate a unique test chip for each customer, but then the customer cannot experiment with different configurations during system bring-up, and fabricating a unique version for each configuration is very expensive. It would, therefore, be desirable to devise an improved method of creating rapid prototype data processing systems that would allow a single hardware solution to satisfy the complete matrix of possible legal configurations of user selected cores. It would be further advantageous if the method provided for quick re-configuration during the verification/debug period to best optimize the total solution of the user system, and thereby ensure that unique ASIC logic will correctly function with the internal control/buses of the selected cores.

SUMMARY OF THE INVENTION

It is therefore one object of the present invention to provide improved method of creating prototype data processing systems.

It is another object of the present invention to provide a configurable development chip to allow such prototyping.

It is yet another object of the present invention to provide such a development chip which may be re-configured during a verification/debug period to optimize a total solution for the user system.

The foregoing objects are achieved in a method of creating a prototype data processing system, generally comprising the steps of configuring a hardware development chip (HDC) having a plurality of data processing macros and a plurality of external ports, according to user-defined settings, building user-defined logic adapted to function with the configured development chip, and interconnecting the user-defined logic to the external ports of the development chip. The data processing macros may include, but are not limited to, a processor core macro, a ROM emulation macro, a memory macro, and a bus macro. The macros are preferably configured by means of a plurality of configuration pins on the HDC which may be set by jumper switches, a user-provided PGA, or other means (including software).

Customer logic is built using a field programmable gate array, which is then interconnected with the external ports. The hardware development chip and customer logic may be controlled by providing a debug port on the HDC, which is connected to a debug workstation. In this manner, a user may easily and quickly debug its ASIC design and its software with its version of selected processor cores, thereby guaranteeing that the unique ASIC logic will correctly function with the internal features of the selected cores. Once the final solution is determined, the system house may submit the configuration settings and the system ASIC portion of the design to a chip integration house.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
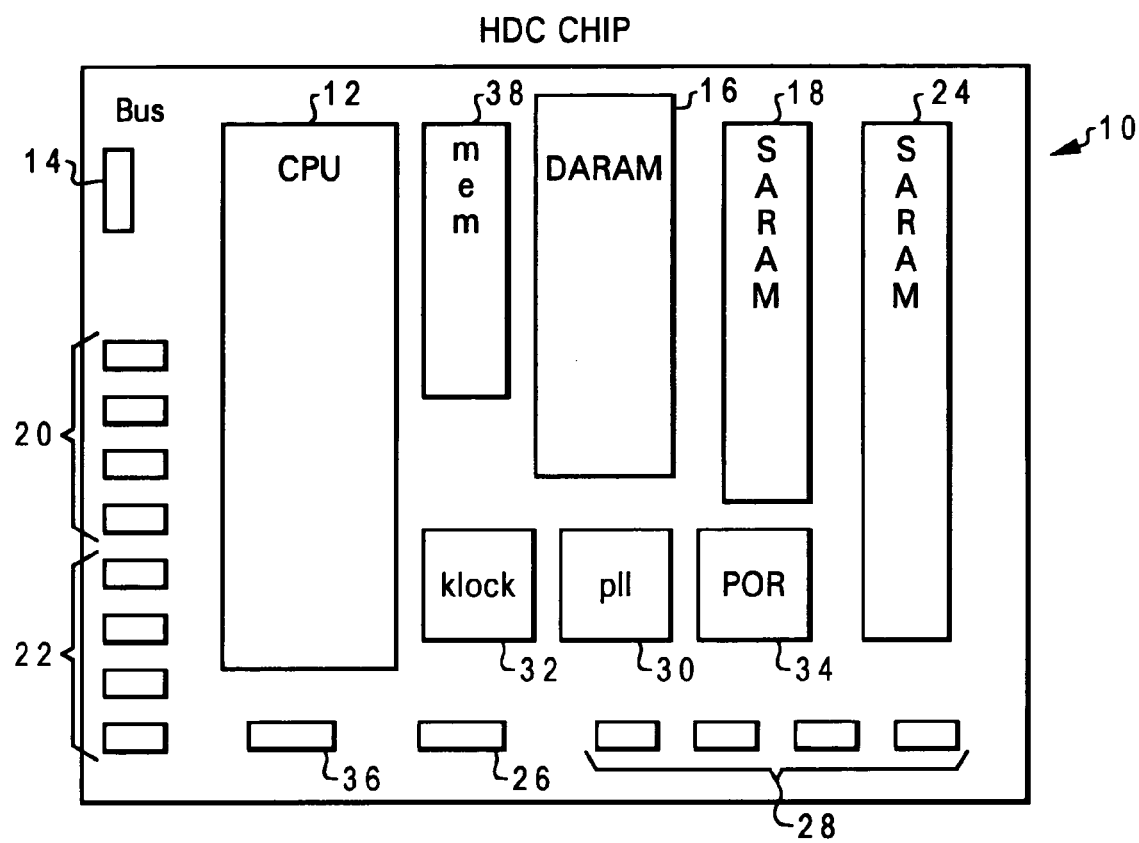
FIG. 1 is a pictorial representation of one embodiment of a hardware development chip (HDC) constructed in accordance with the present invention.

With reference now to the figures, and in particular with reference to FIG. 1, there is depicted one embodiment 10 of a hardware development chip (HDC) constructed in accordance with the present invention. As explained further below, HDC 10 allows rapid prototyping of system hardware with legal configurations for various data processing elements. The specific embodiment disclosed herein is designed for such prototyping using the IBMC54XDSP cores offered by International Business Machines Corp (IBM—assignee of the present invention). Those skilled in the art will appreciate, however, that the invention is not limited to this specific processor architecture. The cores can be dynamically configured to individual structures such that the HDC matches the end configuration. The settings of the structure is accomplished using external means such as configuration pins. The configured HDC can then be placed into the prototype environment for the purpose of varying the unique customer solution. HDC 10 can be re-configured quickly during a verification/debug period to best optimize the total solution of the user system. Once the appropriate configuration has been determined, and the user system has been verified, the configuration settings can be used to create the reduced design that exactly matches the user configuration. The user then adds its portion of system logic, and the merged solution constitutes the final product.

In the illustrative embodiment, HDC 10 is comprised of several core and memory units (macros), including a processor core 12, a bus unit 14, a 16 kilobyte dual-access RAM (DARAM) array 16, a 64 kilobyte single-access RAM (SARAM) array 18, three timers (not shown), four buffered serial ports 20, four standard serial ports 22, a 96 kilobyte SARAM array 24 (to simulate ROM), an external peripheral port 26, four external DMA ports 28, a phase-lock loop (PLL) 30 and PLL control unit ("klock") 32, a power-on reset (POR) circuit 34, a built-in self-test unit 36, and a memory unit 38. The operation of these macros is discussed in detail below.

HDC 10 fully supports standard 1149.1 of the Institute of Electrical and Electronics Engineers (IEEE), commonly known as the "JTAG" standard (formulated by the Joint Test Action Group). This standard describes the requirements for a test access port and boundary scan architecture. The test access port (TAP) is formed by several pins, including a test data in (TDI) pin, a test data out (TDO) pin, a test clock (TCK) pin, a test mode select (TMS) pin and, optionally, a test reset (TRST) pin, which is used to drive the TAP controller to the test-logic-reset state upon assertion. The TAP controller is a 16-state finite state machine (FSM) that controls the boundary scan logic on the integrated circuit. Built-in self-test (BIST) unit 36 uses the test protocol set forth in IEEE standard 1149.1.

Core macro 12 consists of a prefetch unit, a fetch unit, a decode unit, an access/read unit, an execute unit and a store unit. Bus unit 14 is connected to core macro 12. These connections include all required functional signals as well as signals required for JTAG external access, and the software wait state and bank switch control registers. For purposes of the HDC only, the connections to the outside of the HDC chip will be through the appropriate I/O books, but in the users' end product the I/O books will not be used if the connection is to on-chip logic.

Figure 2:
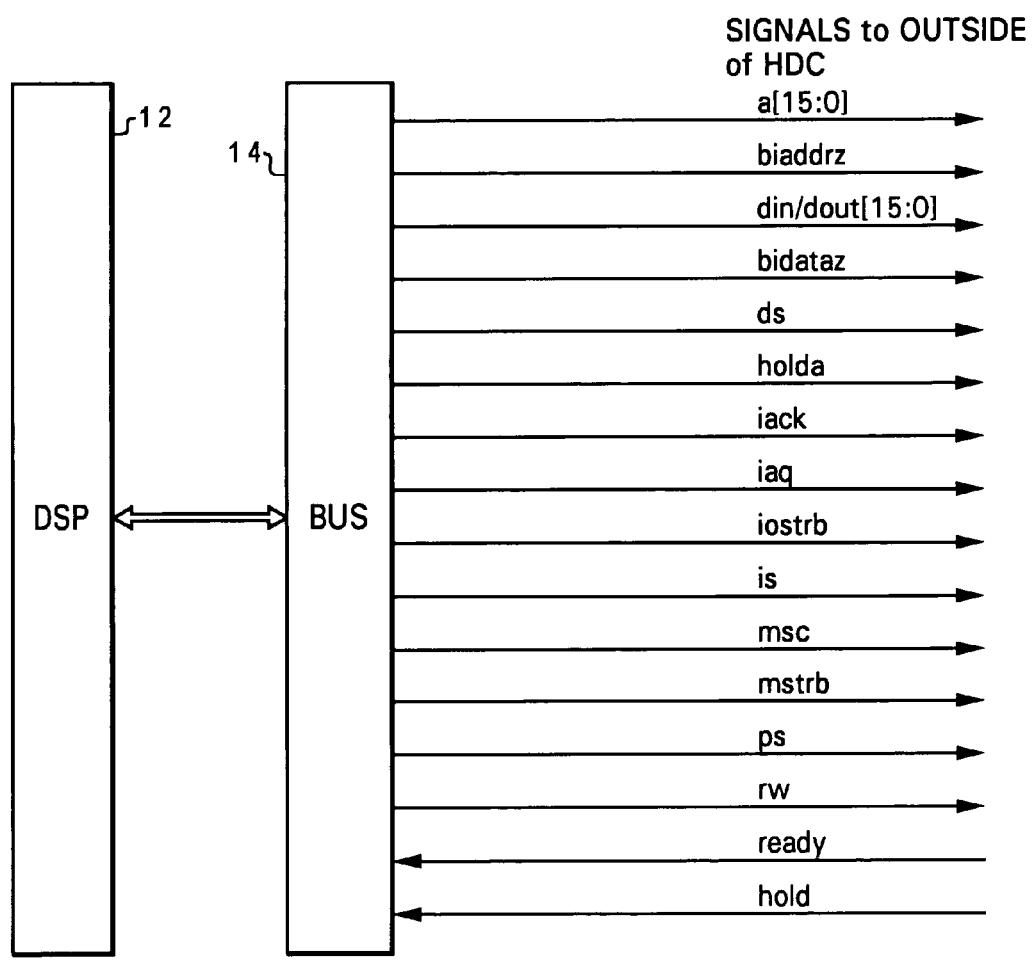
FIG. 2 is a block diagram illustrating a bus unit interface for the HDC of FIG. 1.

Connections from bus macro 14 to the outside of HDC 10 are illustrated in FIG. 2. These include: "a[15:0]", for providing the external bus address; "biaddrz", which enables the address bus; "din/dout[15:0]", for data; "bidataz", which enables the data line; "ds", for the data strobe; "iack", for I/O acknowledgement; "iostrb", for the I/O strobe; "is", to indicate I/O space; "ps", to indicate program space; "msc", for machine state complete, indicating the completion of the current operation; "mstrb", for the memory strobe; "rw", to indicate whether an operation is read or write; "ready", to indicate that the external system is in a ready state; "hold", to request a temporary suspension of all transactions; and "holda", to acknowledge the hold request.

Since HDC 10 is used to develop ROM (firmware) code, 96 k of SARAM 24 (64 k for program space and 32 k for data space) is contained on HDC 10 to provide ROM emulation.

Figure 3:
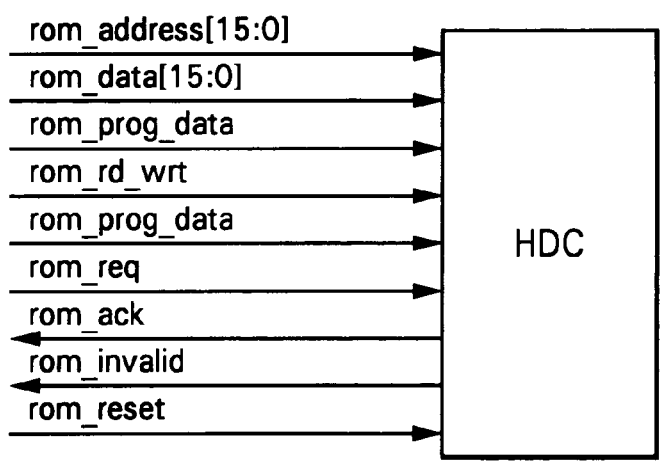
FIG. 3 is a block diagram depicting a ROM emulation interface adapted for use with the HDC of FIG. 1.

Read access from core macro 12 appears as if it was from ROM, however no write access capability is provided for core macro 12. Both write and read access is available to the emulated ROM through the use of the ROM emulation read/write interface shown in FIG. 3. This interface runs off of the same clock as the rest of HDC 10, but can be operated while the remainder of the HDC is held in the RESET state (the ROM emulation interface is provided with its own reset pin).

The ROM interface includes a "rom_address[15:0]" line which is the input address for the current request to either read from or write to the emulated ROM. The address is given according to the memory map as defined by the "personality" interface described further below. The "rom_data[15:0]" line is the data read from the address supplied, or the data to be written to the address. The "rom_prog_data" line specifies that the current request is either for program space or data space. The "rom_rd_wrt" line specifies whether the current request is a read or write operation. The "rom_req" line is used to start the current transaction. When asserted, this line must be maintained until either the "rom_ack" or "rom_invalid" signals (see below) are received. Once "rom_req" is asserted, HDC 10 will sample the "rom_address", "rom_prog_data", "rom_rd_wrt" and "rom_data" lines. The "rom_ack" line is driven to a high state when the current transaction completes, and stays high until the "rom_req" signal is deasserted. The "rom_ack" signal becomes active the cycle after "rom_req" is asserted. The "rom_invalid" line is a qualifier to "rom_ack", and is driven to a high state with "rom_ack" only if the address supplied does not reside in either program or data ROM space. The "rom_invalid" line stays high until "rom_req" is deasserted. The "rom_reset" line must be asserted after power up to reset the interface logic.

The user supplies an address according to the memory map and the personality information supplied on the personality interface, and also specifies whether the request is for program or data space. If the address exists in ROM space, an acknowledge is returned; if the address doesn't exist, an invalid request signal is asserted instead.

Figure 4B:
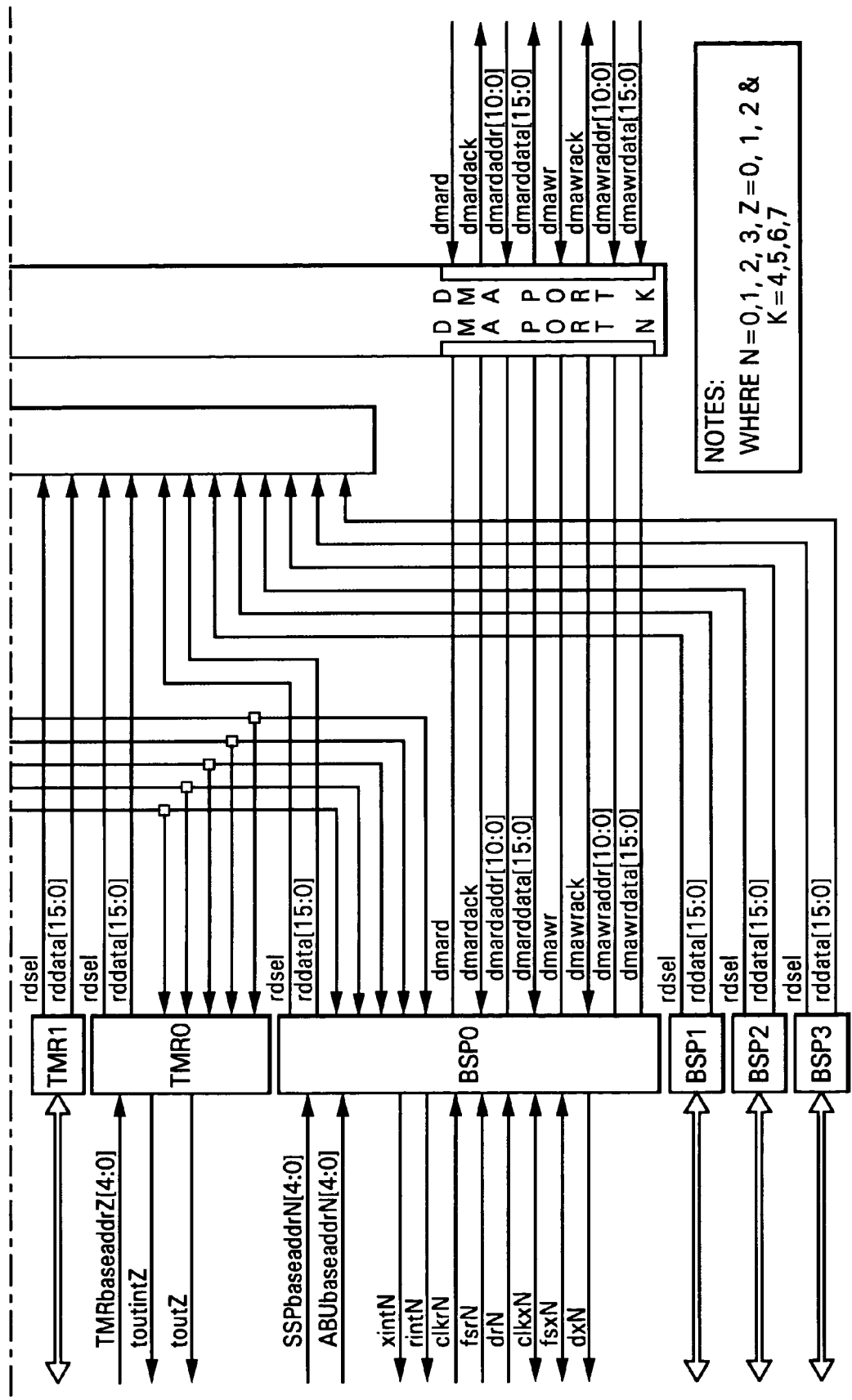
FIG. 4 is a high level schematic diagram illustrating a peripheral ports interface adapted for use with the HDC of FIG. 1.

With further reference to FIG. 4 in this particular embodiment, HDC 10 is designed to handle 16 peripheral units, 12 of which are internal to the HDC. The 12 internal units include the 4 standard serial ports (SSP0 . . . 3), the 4 buffered serial ports (BSP0 . . . 3), the 3 timers (TMR0 . . . 2) and the clock control unit (klock). Eleven of these units each have a unique I/O port on the HDC. The remaining 4 external peripheral units interface to HDC 10 using the IBM defined Peripheral Interface Bus. Each internal peripheral unit has a base address bus input which is used to define the base address for the peripheral unit memory-mapped internal registers (the buffered serial ports each have two base address bus inputs). The customer must ensure that each peripheral's corresponding base address bus has a unique value tied to it. The external serial port is designed such that its memory-mapped internal registers have a unique base address with respect to the other 16 units.

All 16 peripheral units send back read data with a read select to the core macro 12 through a 13:1 multiplexer (referred to herein as the vortex interface) internal to the HDC, and a 4:1 multiplexer external to the HDC. Since all peripherals must have a unique base address which they will respond to, only one read select will be active at any given time.

HDC 10 contains internal peripheral port interrupt outputs for use by the customer for interrupt generation. Each internal standard serial port (SSP0 . . . 3) and each internal buffered serial port (BSP0 . . . 3) has one receiver and one transmitter interrupt output. The three internal timers (TMR0 . . . 2) each have one timer interrupt output. HDC 10 also contains 16 peripheral interrupt inputs which are connected directly to the interrupt flags register (IFR), providing 16 unique pointers to interrupt service routines.

Core macro 12 contains 8 DMA channels, each with its own unique 2 kilobyte DARAM. The four buffered serial ports internal to the HDC are connected to DMA channels 0 . . . 3. DMA channels 4 . . . 7 are provided as external DMA ports 4 . . . 7.

The vortex macro is the master interface between the peripheral interface bus and the main CPU or required elements. The external pins are tied externally for a particular configuration. The main macro/CPU is configured to generate requests for those macros that are enabled by the configuration pins. When a request is broadcast onto the peripheral/optional core buses, only one device will respond. The vortex interface recognizes which device sends an acknowledgment, and routes the correct data bus to the main macro/CPU bus. In this manner a single structure may support a large number of potential configurations.

Figure 5B:
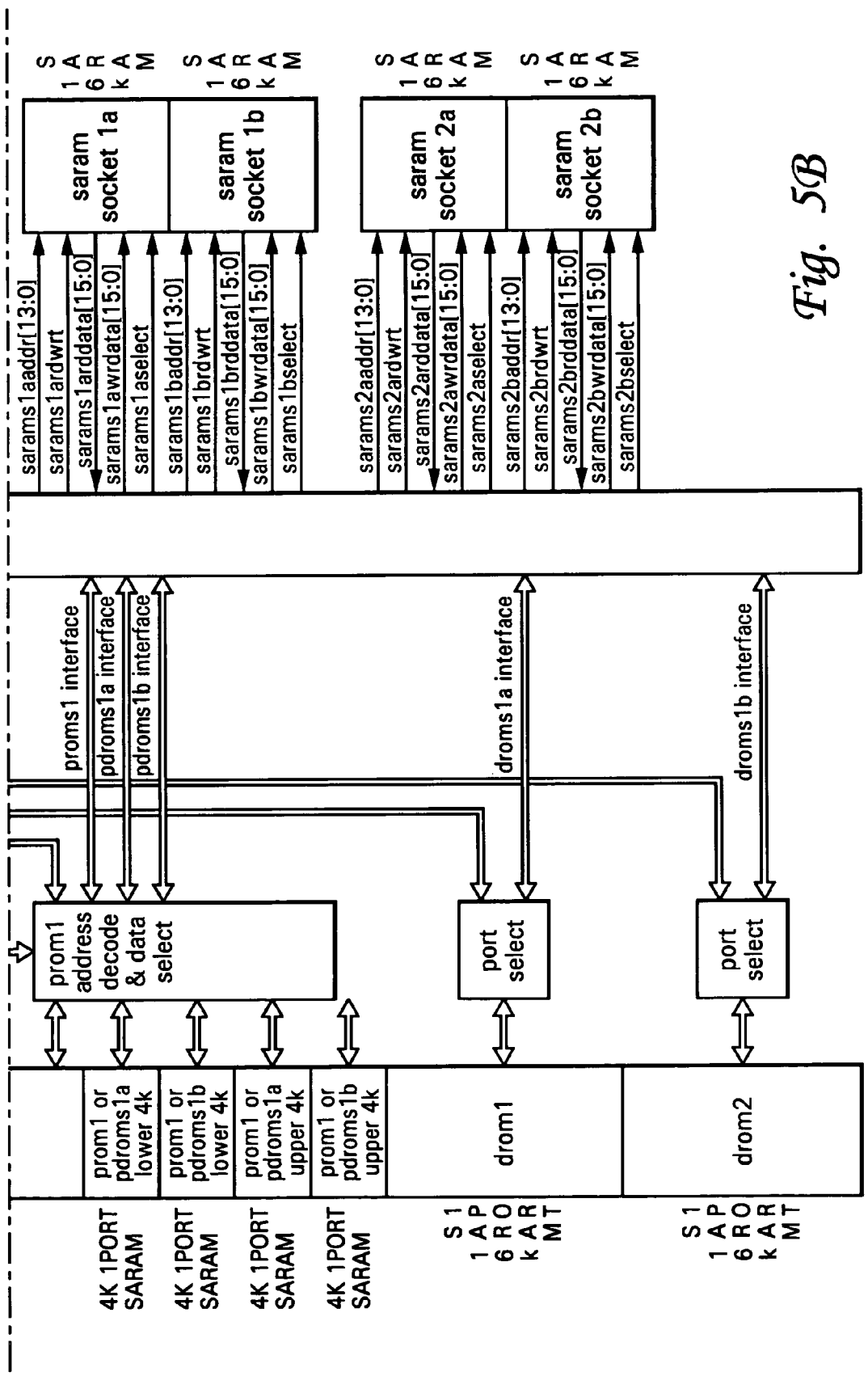
FIG. 5 is a high level schematic diagram depicting a memory configuration for the HDC of FIG. 1.

The personality (configuration) interface of HDC 10 consists of several buses which define the memory map image (see, e.g., FIG. 5), and how the interrupt interface is handled. These buses are static, meaning each pin is either pulled low (0) or high (1), and does not change during functional operation. The pins are set as desired to indicate which peripheral port or memory mappings are valid, setting up the vortex interface.

In addition to the architecture pins, HDC 10 provides the complete I/O connections that are possible for the core-to-ASIC interconnect. These connections are control and data buses that the user ASIC may require, depending on the configuration pins. In this manner, HDC 10 connects the user unique implementation that will be included in the final user silicon. If these pins are not connected or cannot be used based upon a configuration, HDC 10 properly terminates them so as to place them in their inactive states.

Figure 6:
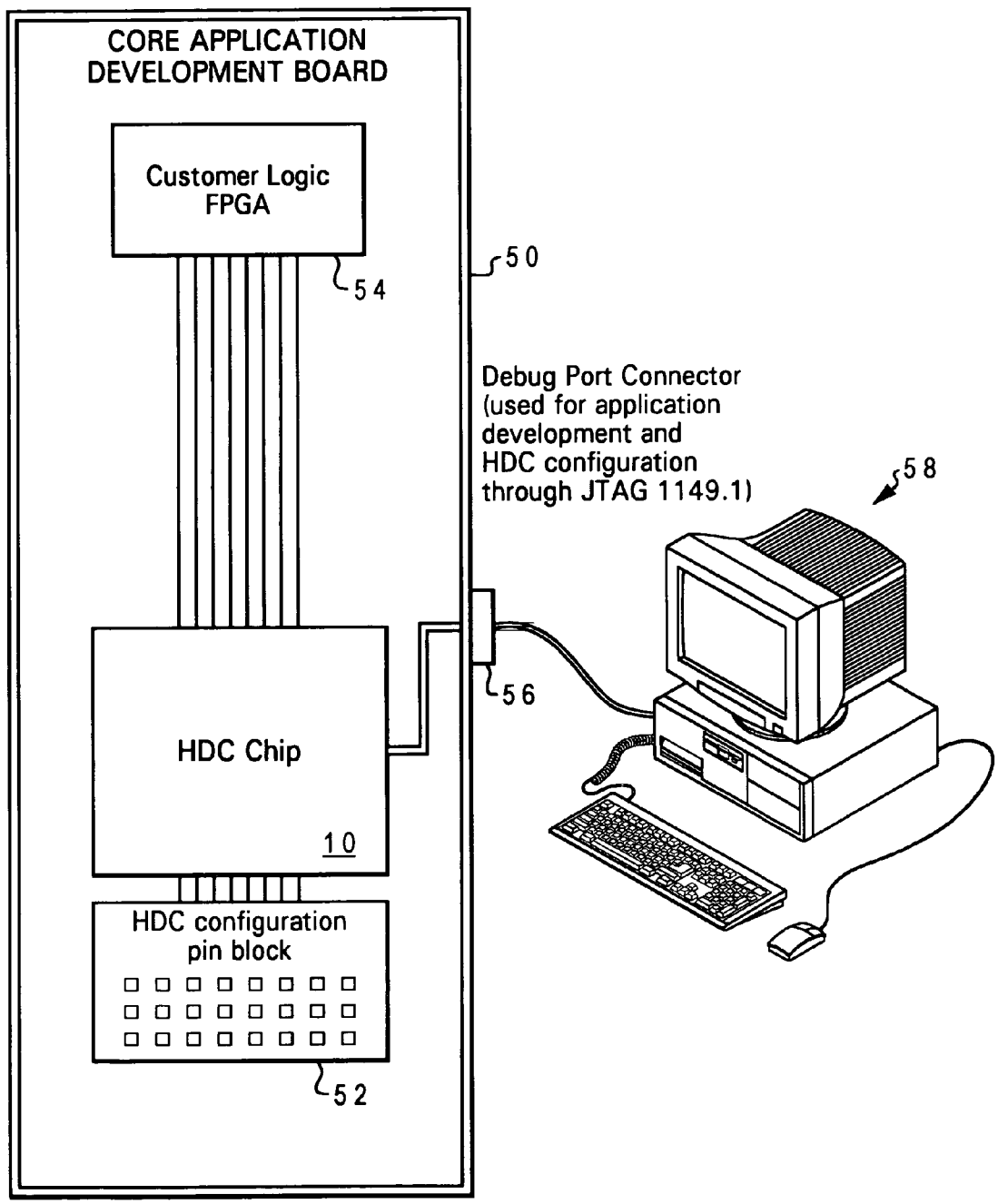
FIG. 6 is a pictorial representation of a system for debugging/verifying a customer application using the HDC of FIG. 1.

With further reference to FIG. 6, a full development vehicle is provided to allow the user to develop user code, run the test bed, and to fully utilize debug functions such as address checkpoint, single stepping, and reading/writing memory and architecture available registers. HDC 10 is mounted on a core application development board 50, along with a configuration pin block 52, and a field programmable gate array (FPGA) 54. The customer builds unique logic which is implemented in FPGA 54. FPGA is then appropriately connected to the various external ports of HDC 10. A debug port connector 56 is used to connect core application development board 50 to a debug workstation 58. While an FPGA may be so used to implement the customer logic, it should be noted that HDC 10 itself requires no FPGA, and so does not suffer from the limitations noted in the Background section above.

HDC 10 contains dedicated test I/O pins to support IBM's level sensitive scan design (LSSD) test methodology. The LSSD scan chain pins may be shared with functional I/O pins. All memory arrays may be tested via the on-board BIST 36. This function is made available only in LSSD test mode.

Due to the flexibility of HDC 10, many hardware solutions are now possible at the system house. Trade-offs can be made between complexity of the external ASIC, internal core selection, and software code space. Critical to the design cycle, the user is debugging its ASIC design with what will be its version of the selected cores. In this manner, the user can guarantee that the unique ASIC logic that they develop will correctly function with the internal control/buses of the selected cores.

Once the final solution is determined, then the system house submits the configuration settings, along with the system ASIC portion of the design, to the chip integration house. The ASIC portion is merged with the HDC based upon the actual configuration settings. In this manner, the absolute minimum size hardware solution is obtained.

HDC 10 allows a single hardware solution to satisfy the complete matrix of possible legal configurations of user selected cores. By simple pin settings, the hardware is "hardwired" to the exact configuration that the final semi-custom implementation will turn out. By providing all the internal buses that usually would not be available to the final package, the ASIC interface is available for the portion of logic that the end customer is designing. Once the customer debugs/verifies its unique design, the pin configuration can be used as a core configuration record, and the chip integration house can merge the customer's logic with the configured cores, into the unique part for the customer. In this fashion, the customer can be ensured that the end ASIC/core hardware will function in a one pass hardware solution.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. In particular, the invention includes numerous specific implementations using data processing macros, such as those described, in alternative interconnection arrangements, and for other processor architectures besides the IBMC54XDSP core. It is therefore contemplated that such modifications can be made without departing from the spirit or scope of the present invention as defined in the appended claims.

What is claimed is:

1. A prototype data processing system, comprising:
   a development chip, further including:
      a processor core;
      an interconnect;
      a memory, coupled to said processor core via said interconnect; and
      a plurality of external ports;
   a user-defined logic module, coupled to said development chip via said plurality of external ports; and
   a plurality of external configuration pins for allowing a user to selectively enable and disable portions of said development chip to enable testing of said prototype data processing system at full operational speed to determine an optimal configuration of said prototype data processing system.

2. The prototype data processing system according to claim 1, wherein said development chip further includes:
   a ROM emulation unit having boot instructions for starting up said prototype data processing system.

3. The prototype data processing system according to claim 1, wherein said development chip supports IEEE standard 1149.1.

4. A development chip, comprising:
   a processor core;
   an interconnect; and
   a memory, coupled to said processor core via said interconnect; and
   a plurality of external ports for coupling said development chip to a user-defined logic module to enable testing of an interaction between said development chip and said user-defined logic module at full operation speed to determine an optimal configuration of said user-defined logic module and said development chip by allowing a user to selectively enable and disable portions of said development chip via a plurality of external configuration pins.

5. The development chip according to claim 4, further including:
   a ROM emulation unit having boot instructions for starting up said development chip and said user-defined module.

6. The development chip according to claim 4, wherein said development chip supports IEEE standard 1149.1.

7. A method of testing a prototype data processing system, wherein said prototype data processing system includes a development chip and a user-defined logic module, comprising:
   configuring a development chip according to user-defined settings, wherein said development chip further includes a plurality of external ports;
   configuring a user-defined logic module according to user-defined settings;
   coupling said user-defined logic module to said development chip via said plurality of external ports;
   testing of an interaction between said development chip and said user-defined logic module at full operational speed by allowing a user to selectively enable and disable portions of said development chip to determine an optimal configuration of said prototype data processing system.

8. The method of testing a prototype data processing system according to claim 7, further comprising:
   reconfiguring said development chip in response to a result of said testing.

9. The method of testing a prototype data processing system according to claim 7, further comprising:
   reconfiguring said user-defined logic module in response to a result of said testing.

10. The method of testing a prototype data processing system according to claim 7, further comprising:
    emulating a read-only memory having boot instructions for starting up said development chip and said user-defined logic module.

11. The method of testing a prototype data processing system according to claim 7, further comprising:
    utilizing said optimal configuration to fabricate a data processing system.

* * * * *